United States Patent
Rüchardt et al.

(10) Patent No.: US 10,648,521 B2
(45) Date of Patent: *May 12, 2020

(54) METHOD FOR CONTROLLING A PNEUMATIC ACTUATOR

(71) Applicant: ZF Friedrichshafen AG, Friedrichshafen (DE)

(72) Inventors: Christoph Rüchardt, Bodolz (DE); Thomas Jäger, Meckenbeuren (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/218,534

(22) Filed: Dec. 13, 2018

(65) Prior Publication Data
US 2019/0186564 A1    Jun. 20, 2019

(30) Foreign Application Priority Data
Dec. 18, 2017   (DE) .......................... 10 2017 223 049

(51) Int. Cl.
*F16D 48/06* (2006.01)
*F16D 48/02* (2006.01)

(52) U.S. Cl.
CPC ........... *F16D 48/066* (2013.01); *F16D 25/14* (2013.01); *F16D 48/02* (2013.01);
(Continued)

(58) Field of Classification Search
CPC ........ F16D 48/06; F16D 48/066; F16D 48/10; F16D 25/14; F16D 2500/1028; F16D 2500/511
See application file for complete search history.

(56) References Cited

U.S. PATENT DOCUMENTS 2,778,344 A * 1/1957 Compton ................. F15B 15/02
91/45
5,221,845 A * 6/1993 Mooney ................... H01J 37/20
250/442.11
(Continued)

FOREIGN PATENT DOCUMENTS

DE         102 39 634 A1    3/2004
DE    10 2007 041 853 A1    4/2008
(Continued)

OTHER PUBLICATIONS

German Search Report Corresponding to 10 2017 223 049.5 dated Jul. 12, 2018.

*Primary Examiner* — Edwin A Young
(74) *Attorney, Agent, or Firm* — Davis & Bujold PLLC; Michael J. Bujold

(57) ABSTRACT

A method for controlling a pneumatic actuator (1) of a transmission having at least one sealing element (6, 7) that is arranged between two elements (2, 3) of the actuator (1) that move relative to one another, and within a specifiable operating temperature range in which a leakproofness of the actuator (1) is ensured. The pneumatic actuator is acted upon with compressed air from an air supply system for actuating a transmission component. When a temperature of the actuator (1) is below a glass transition temperature of the at least one sealing element (6, 7), the actuator (1) is acted upon with pre-heated compressed air from the air supply system to warm up the at least one sealing element (6, 7) above the glass transition temperature.

12 Claims, 2 Drawing Sheets

(52) U.S. Cl.
CPC ........... *F16D 2500/1028* (2013.01); *F16D 2500/3122* (2013.01); *F16D 2500/511* (2013.01); *F16D 2500/70448* (2013.01)

(56) References Cited

U.S. PATENT DOCUMENTS

| | | |
|---|---|---|
| 5,562,190 A | 10/1996 | McArthur |
| 2005/0067011 A1* | 3/2005 | Linden .............. A62C 2/04 137/79 |
| 2009/0205408 A1 | 8/2009 | Karlsson et al. |
| 2016/0177881 A1* | 6/2016 | Wicks ............ F02M 35/10268 123/568.12 |
| 2019/0186562 A1* | 6/2019 | Ruchardt ............ F16D 48/06 |

FOREIGN PATENT DOCUMENTS

| | | |
|---|---|---|
| DE | 10 2009 045 090 A1 | 3/2011 |
| DE | 10 2012 220 242 A1 | 5/2014 |
| WO | 2015/074655 A1 | 5/2015 |

* cited by examiner

METHOD FOR CONTROLLING A PNEUMATIC ACTUATOR

This application claims priority from German patent application serial no. 10 2017 223 049.5 filed Dec. 18, 2017.

FIELD OF THE INVENTION

The invention relates to a method for controlling a pneumatic actuator of a transmission. In addition, the invention relates to a control unit for carrying out the method and to a corresponding computer program product.

BACKGROUND OF THE INVENTION

From practice automatic or automated transmissions having a pneumatically or hydraulically actuated automated clutch, in particular a pneumatically or hydraulically actuated starting clutch are known, wherein the clutch of the transmission is actuated to open and to close by a pneumatic or hydraulic clutch actuator. Such a clutch actuator has an actuating cylinder which is coupled to the clutch, with control valves associated with the actuating cylinder of the clutch actuator, and depending on their switched position these valves either fill or empty the actuating cylinder. The control valves of the clutch actuator are controlled by a control unit.

A clutch arranged in the drive-train of a motor vehicle, between a drive motor, for example in the form of an internal combustion engine, and a manual transmission, serves during traction operation to transmit torque from the drive motor to the manual transmission; during overdrive operation it also acts in the reverse direction. In its non-activated condition the clutch is fully closed by the action of a pressure spring, and transmits the torque without slip by virtue of static friction. In starting processes, shifting processes and emergency braking the clutch is opened and the power flow between the drive motor and the manual transmission is therefore temporarily interrupted or at least reduced.

In a starting process, when a starting gear has been engaged the clutch is closed again continuously, whereby the torque of the drive motor is transmitted in slipping operation by sliding friction, and thereby a rotational speed equalization takes place between the drive output shaft of the rapidly rotating drive motor and the initially static and then at first more slowly rotating input shaft of the manual transmission. In a shifting process between an engaged, loaded gear and a target gear to be engaged, opening of the clutch enables the loaded gear to be disengaged while free from load and thereafter enables the load-free synchronization and engagement of the target gear. During emergency braking, opening the clutch allows the drive force of the drive motor to be taken up by the drive wheels.

It is very important that the clutch actuator that serves to actuate the clutch should operate in a leakproof manner. Thus, leakproofness of the clutch actuator is vital for the correct operation of the clutch or its clutch actuator. Typically an operating temperature range is defined, within which the clutch actuator must have a specified leakproofness, whereas outside this defined operating temperature range operation of the clutch actuator and hence operation of the clutch are not permitted.

From DE 10 2009 045 090 A1 a method for operating an automated clutch is known. During the operation of the transmission, if defined operating conditions occur, such as the temperature falling below a limiting temperature value, the leakproofness of a clutch actuator serving to operate the clutch is checked. On the basis of that check, it can then be decided whether, and if needs be under which conditions further operation of the clutch is permissible.

SUMMARY OF THE INVENTION

The purpose of the present invention is to provide a new type of method for controlling a pneumatic actuator, by virtue of which a shorter warm-up phase at low temperatures can be achieved. In addition a control unit designed to carry out the method and a computer program product for carrying out the method are indicated.

From the process-technological standpoint this objective is achieved with the characterizing features of the independent claims. In addition, a control unit for controlling a pneumatic actuator of a transmission as well as a computer program product are objects of the independent claims. Advantageous further developments are the object of the subordinate claims and of the description that follows.

A method is proposed for the control of a pneumatic actuator of a transmission, wherein at least one sealing element is arranged between two elements of the actuator that can move relative to one another.

The transmission is preferably a multi-gear transmission in which a number of transmission steps, i.e. fixed gear ratios, can be engaged between two shafts of the transmission by means of shifting elements, preferably in an automated manner. Such transmissions are used mainly in motor vehicles, in particular also in utility vehicles, in order to adapt suitably the rotational speed and torque output characteristic of the drive aggregate to the driving resistance of the vehicle.

The actuator can be in the form of a piston-cylinder unit, with at least one sealing element arranged between the piston and the cylinder. The piston is arranged to move axially relative to the cylinder of the piston-cylinder unit. The sealing element can be, for example, in the form of a rectangular sealing ring or an O-ring seal.

The pneumatic actuator of the transmission can for example be in the form of an actuator for selecting and/or engaging transmission gears of the transmission or an actuator for opening and closing a shifting and/or starting clutch arranged between a drive aggregate and the transmission. The actuator for opening and closing the shifting and/or starting clutch is also known as a clutch actuator and can for example be in the form of a central release device. When designed as a central release device it is usually in the form of a piston-cylinder unit arranged concentrically with a transmission input shaft.

The actuator is acted upon, within a specifiable operating temperature range that ensures that the actuator is leakproof, by an air supply system for actuating a transmission component with compressed air. The air supply system can for example comprise an air compressor as well as pressure medium lines and control or regulating valves designed as inlet or outlet valves for actuating the actuator. The air compressor can be a compressor already present in a motor vehicle in which the transmission is fitted.

The invention, now, is based on the technical principle that the actuator is already acted upon with compressed air from the air supply system when a temperature of the actuator is below a glass transition temperature of the at least one sealing element.

In other words, compressed air from the air supply system already flows through the actuator when the temperature of the actuator or the temperature of the sealing element of the actuator is outside the defined operating temperature range and the actuator is not leakproof due to the low temperatures and cannot therefore be operated correctly.

Pneumatic sealing elements, when their temperature falls below a so-termed glass transition temperature, also called the glass temperature, lose their effectiveness as seals. The glass transition temperature can for example be within a temperature range between −15° C. to −20° C., preferably at a temperature of −18° C. In the temperature range below the glass transition temperature, the sealing element is in a hard-elastic, glasslike, brittle condition in which the sealing element no longer fulfills its sealing function.

Without additional measures the necessary warming process of the actuator takes a lot of time, during which the transmission and hence the motor vehicle cannot be used. By virtue of the method according to the present invention the warming of the pneumatic sealing element to a temperature above the glass transition temperature can be considerably accelerated, since the warming is influenced actively.

By acting upon the actuator with preheated compressed air from the air supply system, the actuator and thus the sealing element of the actuator is warmed up. This can take place during a warm-up phase of the transmission or the motor vehicle.

In an advantageous further development it is provided that the compressed air passing into the actuator is preheated in a through-flow heater arranged in the air supply system. In that way the temperature of the air passing into the actuator can be raised more rapidly and the time needed for warming the actuator or its sealing element is correspondingly made shorter. By the through-flow heater the compressed air passing into the actuator can be warmed, for example, by a cooling water circuit of the drive aggregate, or electrically. The drive aggregate of the motor vehicle can be in the form of a combustion engine or internal combustion engine, an electric motor or a hybrid drive comprising an internal combustion engine and an electric motor.

When the temperature of the actuator or the temperature of its sealing element has risen above the glass transition temperature of the sealing element, the flow of compressed air from the air supply system can be discontinued again. When the glass transition temperature has been reached or exceeded, the actuator is leakproof and is therefore ready for use. Consequently the warming process can be terminated.

The inflow of compressed air from the air supply system during the warm-up process is preferably also discontinued when a maximum permissible switched-on duration of electro-pneumatic switching valves of the air supply system is reached. This protects the switching valves against excessive heating of the valve solenoids.

In an advantageous further development it is provided that for the control of the electro-pneumatic switching valves individual pulses are emitted with a specifiable constant or variable pulse frequency. With reference to the pulse frequency with which at least an inlet valve of the air supply system is activated, and a determination of the position of the actuator during the application of pressure, the degree of leakproofness of the actuator or its sealing element can be concluded. That information can be used in addition for determining the time at which the warm-up process should be discontinued.

The invention also relates to a control unit CU for controlling a pneumatic actuator of a transmission, which is designed to carry out the method according to the invention. The control unit CU (see FIG. 1) comprises means that serve to implement the method according to the invention. These means include hardware means and software means. The hardware means of the control unit are data interfaces DI for the exchange of data with the assemblies of the drive-train involved in carrying out the method according to the invention. For that purpose the control unit CU is also connected to the necessary sensors and, if needs be, also to other control units such as an engine control unit, in order to receive the decision-relevant data and to pass on control commands. The control unit CU can for example be a transmission control unit. The hardware means of the control unit CU also include a processor P for data processing and if necessary a memory M for data storage. The software means consist of program modules for implementing the method according to the invention.

The system according to the invention can also be embodied as a computer program product which, when it runs on a processor P of a control unit CU, instructs the processor by software means to carry out the associated process steps that are objects of the invention. In this connection a computer-readable medium is also an object of the invention, on which medium the computer program product described above can be retrievably stored.

The invention is not limited to the combination of features indicated in the independent claims or the claims that depend on them. There are also possibilities for combining individual features with one another, provided that they emerge from the claims, the description of embodiments given below, or directly from the figures.

BRIEF DESCRIPTION OF THE DRAWINGS

Preferred further developments emerge from the subordinate claims and the following description. An example embodiment of the invention, to which it is not limited, is explained in greater detail with reference to the drawings, which show:

DETAILED DESCRIPTION OF THE PREFERRED EMBODIMENTS

Figure 1:
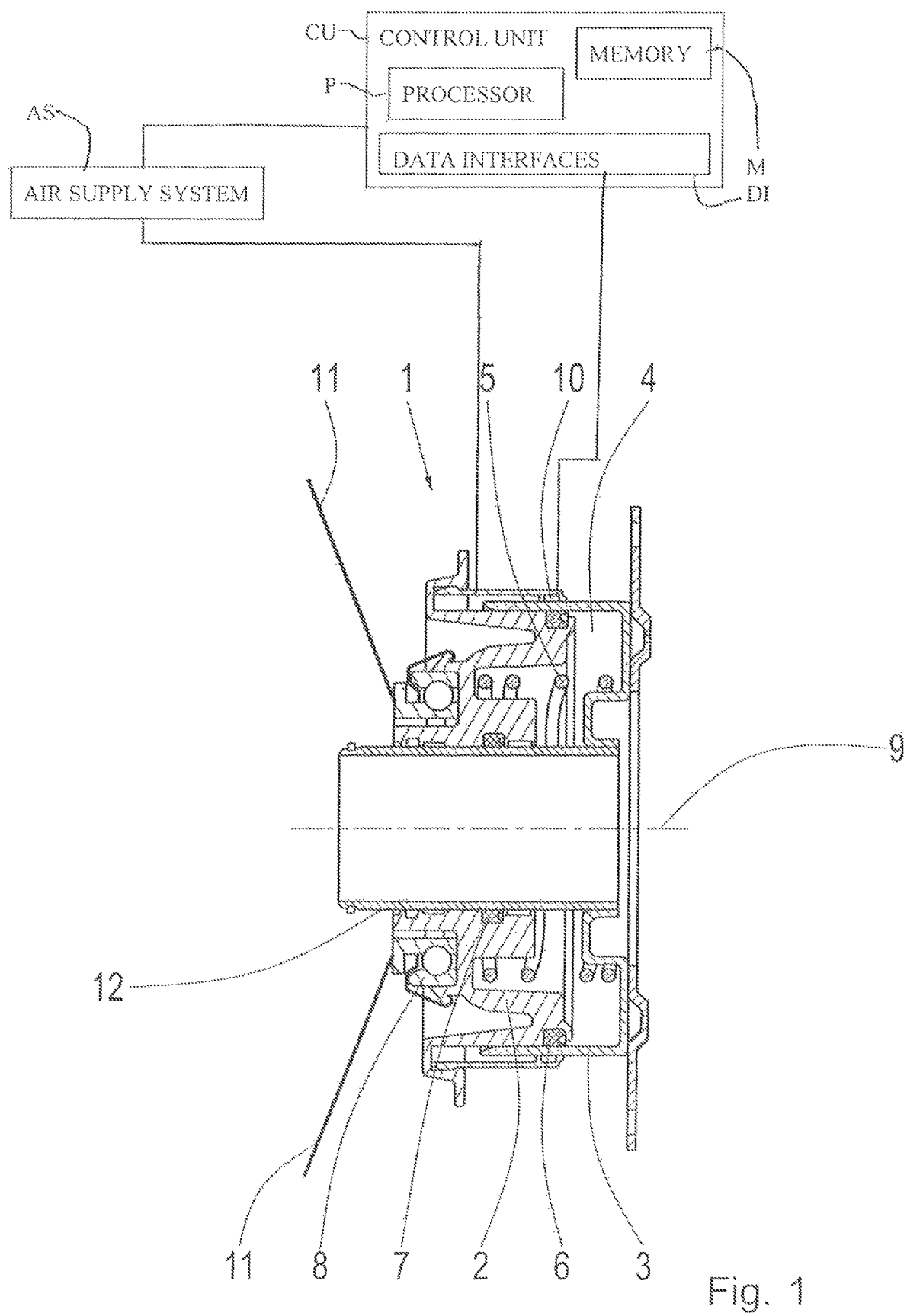
FIG. 1: A pneumatic actuator of a transmission.

The pneumatic actuator 1 shown in FIG. 1 is a clutch actuator for opening and closing a shifting and/or starting clutch in the form of a central release device arranged between a drive aggregate and a transmission. In this case the clutch actuator 1 comprises a cylinder 3 with an annular cylinder body. In the cylinder 3 is arranged a piston 2 that can move axially along a rotational axis 9 of the shifting and/or starting clutch on a guide-tube 12. The piston 2 is in the form of an annular piston and carries a release bearing 8, which co-operates with a pressure plate 11 of the shifting and/or starting clutch. The pressure plate 11 can for example be in the form of a membrane spring.

Between the piston 2 and the cylinder 3 is arranged an outer sealing element 6 and between the piston 2 and the guide-tube 12 is arranged an inner sealing element 7. In this case the sealing elements 6, 7 are in the form of elastomer groove rings.

Furthermore, between the piston 2 and the cylinder 3 is arranged a spring 5, which pushes the piston 2 away from the cylinder 3 and therefore applies a defined load on the piston 2 and the release bearing 8, without the clutch actuator 1 being acted upon by compressed air. Accordingly, the spring 5 is also called a pre-load spring.

The position of the piston 2 can be detected by a path sensor 10. To detect the temperature of the clutch actuator 1, a temperature sensor (not shown here) can be used.

The clutch actuator 1 is actuated and moved to the left in the plane of the figure, when from an air supply system (AS) of a motor vehicle compressed air is supplied to a pressure chamber 4 between the piston 2 and the cylinder 3.

When the clutch actuator 1 is not actuated, the shifting and/or starting clutch arranged between the drive aggregate and the transmission is closed. If the temperature falls below a glass transition temperature of the sealing elements 6, 7, these and therefore the clutch actuator 1 as well are no longer leakproof and the starting and/or shifting clutch cannot be opened by the clutch actuator 1, or only incompletely so. To warm up the clutch actuator 1 the drive aggregate of the motor vehicle then has to be operated at an idling rotational speed for a longer time. During this, the release bearing 8 lightly prestressed by the spring 5 is warmed by the waste heat emitted. Indirectly, therefore, the piston 2 and the sealing elements 6, 7 are also warmed. As soon as the sealing elements 6, 7 reach a temperature above the glass transition temperature of the sealing elements 6, 7, the sealing elements fulfill their sealing function and the clutch actuator 1 is ready to operate. Since the gradient at which the temperature of the sealing elements 6, 7 rises is very shallow, at low temperatures the warm-up process can take a correspondingly long time. For the driver of the vehicle this results in unacceptably long waiting times.

Thus, according to the invention it is provided that the clutch actuator 1 is already acted upon by compressed air from the air supply system when a temperature of the clutch actuator 1 is lower than a glass transition temperature of the at least one sealing element 6, 7.

This actively influences the warm-up process and a warming of the pneumatic sealing elements 6, 7 to a temperature above their glass transition temperature can be substantially accelerated. Accordingly, the clutch actuator 1 and thus too the transmission and the motor vehicle are ready to operate at an earlier time.

Due to the action of pressure in the pressure chamber 4, despite the imperfect sealing the piston 2 of the clutch actuator 1 undergoes an axial movement in the direction toward the pressure plate 11 of the shifting and/or starting clutch. This increases the load acting on the release bearing 8. If the drive aggregate is already in operation, then the pressure plate 11 of the shifting and/or starting clutch also rotates at the rotational speed of the drive aggregate. Consequently, owing to the increased load on the release bearing 8, the release bearing 8 is warmed more quickly and, with the release bearing 8, so too are the piston 2 and the sealing elements 6, 7 respectively between the piston 2 and the cylinder 3 and between the piston 2 and the guide-tube 12.

Alternatively or in addition to the detection of the temperature of the clutch actuator 1 by a temperature sensor, the temperature of the clutch actuator 1 or the temperature of the piston 2 of the clutch actuator 1 can also be determined. Since the load acting on the release bearing 8 is proportional to the release path that can be covered by the piston 2 due to the action of pressure, by virtue of path signals picked up by the path sensor 10 the load acting on the release bearing 8 can be deduced. From the known load on the release bearing 8 a temperature gradient can be determined, with which the piston 2 of the clutch actuator 1 warms up. Finally, by integrating the temperature gradient produced over time in each case, the warming behavior of the piston 2 of the clutch actuator 1 and therefore the temperature of the piston 2 and the temperature of the sealing elements 6, 7 can be deduced.

Figure 2:
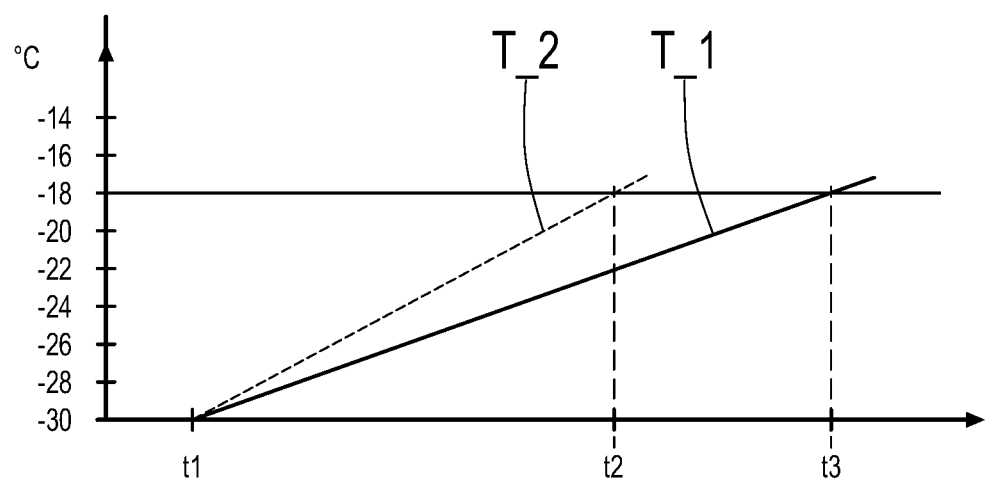
FIG. 2: A diagram in which temperature variations of the actuator are shown as a function of time.

FIG. 2 shows a schematic diagram in which temperature variations of the clutch actuator 1 are shown as a function of time. The temperature in ° C. is plotted along the ordinate and the time t along the abscissa. For example, temperature variations are shown which are produced at the piston 2 of the clutch actuator 1 during a warm-up phase of the transmission or the motor vehicle. When the temperature is below a glass transition temperature of the sealing elements 6, 7, which is indicated in this case as around −18° C., the sealing elements and thus also the clutch actuator are not leakproof and the starting and/or shifting clutch cannot be opened by means of the clutch actuator 1, or only incompletely so. Only when the glass transition temperature has been reached or exceeded can the sealing elements 6, 7 and therefore also the clutch actuator 1 be operated again. In this example a warm-up phase is started at time t1 at an assumed temperature of −30° C.

The continuous line T_1 shows a time variation of the temperature of the piston 2 of the clutch actuator 1 when the clutch actuator 1 is not actuated during the warm-up phase. The gradient with which the temperature of the piston 2 increases is very shallow, so the glass transition temperature is not reached until a time t3 and the warming-up process takes a correspondingly long time.

The broken line T_2 shows a time variation of the temperature of the piston 2 of the clutch actuator 1 when, during the warm-up phase, the clutch actuator 1 is already acted upon with compressed air. Since the warming-up process is actively influenced by the action of pressure, the warming up of the piston 2 of the clutch actuator 1 to a temperature above the glass transition temperature can be substantially accelerated. In this case the glass transition temperature is already reached at a time t2.

INDEXES

1 Actuation means, clutch actuator
2 Piston
3 Cylinder
4 Pressure chamber
5 Pre-load spring
6 Outer sealing element
7 inner sealing element
8 Release bearing
9 Rotational axis
10 Path sensor
11 Pressure plate
12 Guide-tube

The invention claimed is:

1. A method for controlling a pneumatic actuator of a transmission having at least one sealing element arranged between two elements of the actuator that move relative to one another, and a leakproofness of the actuator, within a specifiable operating temperature range, is ensured by the at least one sealing element, and the actuator being acted upon by compressed air, from an air supply system, for actuating a transmission component, the method comprising:

when a temperature of the actuator is below a glass transition temperature of the at least one sealing element, acting upon the actuator with compressed air from the air supply system.

2. The method according to claim 1, further comprising preheating the compressed air supplied to the actuator by a through-flow heater arranged in the air supply system.

3. The method according to claim 1, further comprising discontinuing the supply of compressed air from the air supply system when either the temperature of the actuator or a temperature of the at least one sealing element, arranged between the two elements of the actuator that move relative to one another, exceeds the glass transition temperature.

4. The method according to claim 1, further comprising discontinuing the supply of compressed air from the air supply system when a maximum permissible switched-on time of an electro-pneumatic switching valve of the air supply system is reached.

5. The method according to claim 1, further comprising deducing a degree of leakproofness of either the actuator or the at least one sealing element with reference to a pulse frequency at which inlet valves of the air supply system are controlled in order to actuate the actuator, and a determined position of the actuator while the actuator is being acted upon by pressure.

6. A control unit for controlling the actuator of the transmission, wherein the control unit comprises a processor, for running operating software, and hardware data interfaces for an exchange of data, the control unit is connected to at least one sensor in order to receive decision-relevant data and to pass on control commands from the control unit to the air supply system and carrying out the method according to claim 1.

7. The method according to claim 6, further comprising providing the control unit with a memory for data storage.

8. A computer program product with program code modules stored on a computer-readable data carrier, for carrying out the method according to claim 1 when the computer program product is run on a computer or an appropriate computer unit of a control unit of the pneumatic clutch actuator.

9. The method according to claim 1, further comprising the at least one sealing element comprising first and second sealing elements,
locating the first sealing element between the two elements of the actuator that move relative to one another, and
locating the second sealing element between a guide-tube and one of the two elements of the actuator that move relative to one another.

10. The method according to claim 9, further comprising using a piston as a first of the two elements of the actuator, and
using a cylinder as a second of the two elements of the actuator.

11. A method for controlling a pneumatic actuator of a transmission having a pair of sealing elements arranged between two elements of the actuator that move relative to one another, a leakproofness of the actuator, within a specifiable operating temperature range, is ensured by the pair of sealing elements, and the actuator being acted upon by compressed air, from an air supply system, for actuating a transmission component, the method comprising:
when a temperature of the actuator is below a glass transition temperature of the pair of sealing elements, acting upon the actuator with pre-heated compressed air, from the air supply system, to warm the pair of sealing elements to a temperature above the glass transition temperature.

12. A method for controlling a pneumatic actuator of a transmission having a first sealing element arranged between a piston and a cylinder, that move relative to one another, and a second sealing element arranged between the piston and a guide-tube, a leakproofness of the actuator is ensured, by the first and the second sealing elements, over a specifiable operating temperature range, and the actuator being acted upon, by compressed air from an air supply system, for actuating a transmission component, the method comprising:
when a temperature of the actuator is below a glass transition temperature of at least one of the first and the second sealing elements, supplying compressed air from the air supply system to the actuator to raise a temperature of the first and the second sealing elements above the glass transition temperature of the first and the second sealing elements.

* * * * *